United States Patent [19]

Harmel

[11] Patent Number: 4,486,861

[45] Date of Patent: Dec. 4, 1984

[54] TRANSPONDER TELEMETRY

[75] Inventor: Norman A. Harmel, Greensboro, N.C.

[73] Assignee: AT&T Technologies, Inc., New York, N.Y.

[21] Appl. No.: 334,290

[22] Filed: Dec. 24, 1981

[51] Int. Cl.³ ............................................. H04B 11/00
[52] U.S. Cl. .......................................... 367/2; 367/6; 367/106; 367/134; 405/166
[58] Field of Search ........................ 367/2, 6, 106, 134; 405/164, 165, 166, 168

[56] References Cited

U.S. PATENT DOCUMENTS

| | | | |
|---|---|---|---|
| 2,142,135 | 1/1939 | Lawton | 405/165 |
| 3,183,477 | 5/1965 | Ricalzone | 367/2 |
| 3,427,554 | 2/1969 | Lagoe et al. | 367/2 X |
| 3,512,125 | 5/1970 | Raymond | 367/134 |
| 3,673,552 | 6/1972 | Mross et al. | 367/134 X |
| 3,860,900 | 1/1975 | Scudder | 367/6 |
| 4,037,189 | 7/1977 | Bell et al. | 367/6 |
| 4,124,990 | 11/1978 | Bell et al. | 405/167 |
| 4,187,492 | 2/1980 | Delignieres | 367/127 |
| 4,388,710 | 6/1983 | Pecon, Jr. | 367/134 |

OTHER PUBLICATIONS

Underwater Acoustics Catalog, 10 pp., including cover sheet, no date.
ISA Journal, vol. 8, No. 10, Oct. 1961, by T. E. Pochapsky, pp. 34–37.

Primary Examiner—Richard A. Farley
Attorney, Agent, or Firm—W. G. Dosse; R. D. McBurnett; S. I. Rosen

[57] ABSTRACT

Acoustic transponders are attached to sections of a submarine cable for use in accurately locating the cable during deployment or retrieval. An acoustic signal at one frequency, transmitted from the surface or elsewhere, stimulates one of the transponders to generate a first reply signal at a different frequency. The acoustic reply signal generated by each transponder is used to determine the location of that transponder and thus the location of its associated section of the cable. In order to measure cable tension during deployment or retrieval, a strain gauge at each transponder senses the tension of the cable at the location of its associated transponder. After each transponder transmits its first reply signal, it transmits a second reply signal delayed from the first reply signal by a time interval which is controlled by the output of its associated strain gauge. Therefore, the time interval between successive reply signals from a given transponder is representative of cable tension at the location of that transponder.

1 Claim, 4 Drawing Figures

TRANSPONDER TELEMETRY

GOVERNMENT CONTRACT

The invention herein claimed was made in the course of or under contract with the U.S. Navy.

FIELD OF THE INVENTION

The present invention relates to submarine objects and more particularly to using a locating transponder to transmit additional information about an underwater object.

BACKGROUND OF THE INVENTION

In underwater laying and retrieving of cable or pipelines in addition to instrument, oceanographic sensor, or other arrays useful for seismic survey, oceanographic data gathering, or other purposes, it is sometimes necessary to know the exact location of the cable, pipeline or array (which may be called an object) to avoid collisions, obstacles, achieve precise location or intersections, or for any number of other reasons.

A transponder is any active electronic device that receives a signal at one frequency and in response thereto transmits a reply signal. Radar transponders are used in aircraft for identification in congested airspace. Acoustic transponders (typically operating in the range from 7 kHz to 16 kHz) are used for underwater ranging and locating.

Acoustic transponders can be attached to the object for locating using a scheme similar to that disclosed in U.S. Pat. No. 3,860,900 granted to Ronald J. Scudder on Jan. 14, 1975. In this way, a given section of cable (at a given transponder) can be accurately positioned or located with respect to the cable-laying/retrieving vessel and with respect to the fixed transponders of the Scudder patent that are accurately located on the ocean bottom.

However, with the advent of thinner, lighter-weight, more-critically-designed objects, such as light-guide communication cable or other light-weight objects, more information is needed than just the location of a section of an object. For example, newer underwater cables are not quite so robust as older styles of cable; and this delicacy of structure places more critical requirements on the conduct of cable handling. Consequently, as a cable is positioned or retrieved, feedback is important to avoid placing undue tension on the cable and thus damaging it.

It would be desirable to attach strain gauges to the cable and transmit the output from each strain gauge to the cable ship, using acoustic telemetry. However, with all of the acoustic signals involved in using the locating system of the Scudder patent, especially at a substantial depth, the use of still more acoustic signals for strain gauge telemetry might risk confusion from acoustic clutter or might slow the gathering of real-time data, to an unacceptable degree.

The signals sent to the transponder and transmitted by the transponder are short bursts or pulses of tone energy at the frequency selected for the signal. Because of the slow speed of sound, even in water, the transit times of each signal can be many seconds. Multipath signal propagation is the rule rather than the exception in the undersea environment. Therefore, a signal can appear much longer at the receiver than when transmitted. Consequently, signal pulse duration cannot be used as a realistically accurate medium for telemetry, but has been found useful in a gross sense to indicate the existence of binary conditions such as the successful release of a transponder from its anchor to a buoyed tether.

SUMMARY OF THE INVENTION

In accordance with the present invention, information about an underwater object is transmitted by a transponder adapted to receive a signal at one frequency and, in reponse thereto, to transmit a first reply at a second frequency that may differ from the first frequency and to transmit a second reply delayed from the first reply by a time interval representative of the output of a sensor in communication with the object, said sensor having an output characteristic of the information about the object.

BRIEF DESCRIPTION OF THE DRAWINGS

The present invention will be more fully understood by reference to the following detailed description when considered in conjunction with the accompanying drawings wherein the same reference number is used to indicate the same or comparable portions throughout the several views in which.

DETAILED DESCRIPTION

Figure 1:
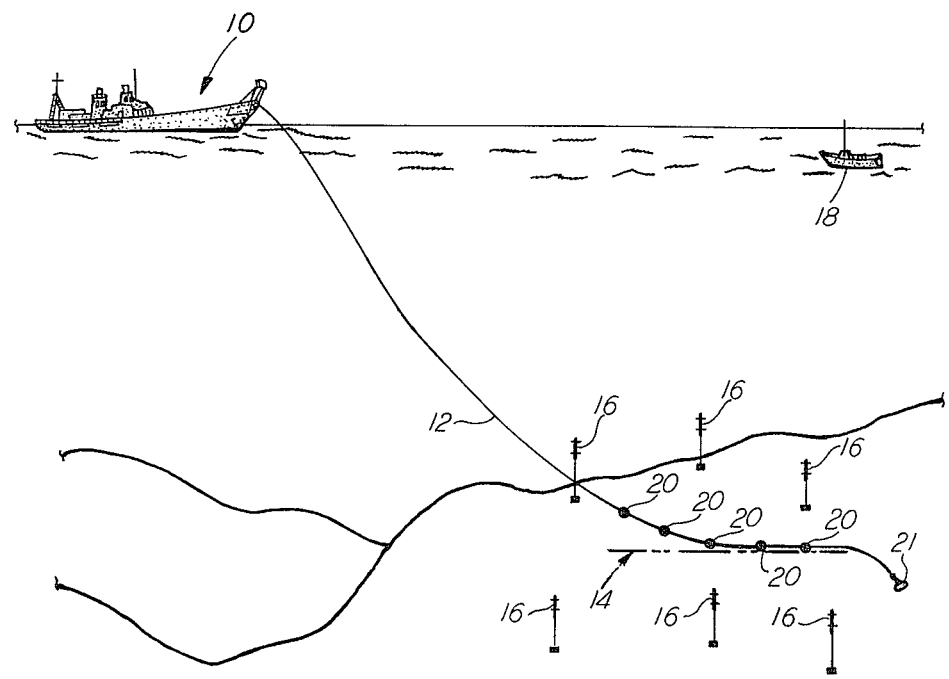
FIG. 1 is an elevation through the underwater environment showing the application of the above-mentioned Scudder patent to using transponders on a cable to position the cable at a predetermined site.

Referring now to the accompanying drawings and more particularly to FIG. 1, there is shown, in elevation, a scene of an undersea environment in which a cable is being positioned onto a specific location on the ocean bottom by a cable ship in conjunction with a survey ship and underwater acoustic transponders anchored near the desired cable location.

A cable ship 10, assigned the task of deploying a length of cable 12 in a very accurately-known position 14 on the ocean bottom, employs an acoustic locating system as disclosed in the above-mentioned Scudder patent, using anchored transponders 16 in conjunction with a survey ship 18.

In accordance with the prior art and using the locating system of the above-mentioned Scudder Patent, the cable ship lowers the length of cable into position. The location of the cable is then determined using the anchored transponders 16 cooperating with a plurality of transponders 20 mounted on the cable itself. If the location of the cable is not exactly as desired, the cable ship backs away and thus applies tension to the cable. That tension, resisted by an anchor 21 on the cable, lifts the affected section of cable, including the transponders, off of the ocean bottom. The cable ship then moves sideways to correct the line of the cable and re-lowers the cable to the ocean bottom. The cable position is then determined once again.

With more modern, lighter-weight and more fragile cables, this brute-force technique of relocating or adjusting the location of a cable is not practical. Modern, more delicate cables cannot tolerate the amount of tension necessary for this relocation technique, without serious risk of sustaining damage.

Therefore, it is desirable to know the location of the cable-mounted transponders at each point of their descent to the ocean bottom so that adjustment can be made during descent. Additionally, it is desired to know the tension which the cable is experiencing at any given time at the location of each transponder.

Figure 2:
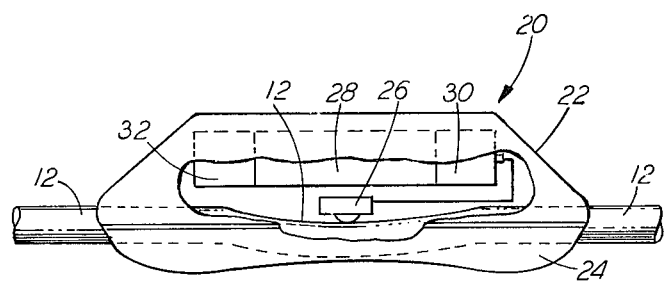
FIG. 2 is a schematic outline of the transponder as it would appear mounted on a cable with a portion being broken away to show the interior arrangement of the transponder.

Referring now to FIG. 2, there is shown in schematic form a cable-mounted transponder 20 having an upper portion 22 and a lower portion 24 clamped together with steel bands or bolts or some combination thereof, so as to grip a cable 12 with a slight flexure or bending of the cable at the center of the transponder housing.

The exterior shape of the portions 22 and 24 of the transponder 20 is streamlined to permit the transponder to ride over cable-handling sheaves on the cable ship 10. The interior of the transponder 20 is arranged to press a strain gauge transducer 26 onto the cable to deflect or bend it. The interior of the transponder 20 also accommodates an electronic circuit module 28, a battery and power supply module 30, and a transceiver transducer module 32, the latter being in free communication with the surrounding water to freely convey acoustic signals.

Instead of the strain gauge, any other type of sensor may be used, e.g., a temperature detector, a scale accumulation detector, or a pressure variation detector.

The bending of the cable around the strain gauge transducer 26 is slight enough to avoid damaging the cable but sufficient to cause any tension in the cable to tend to straighten the cable at the strain gauge transducer 26 and thus apply a force to the transducer that is perpendicular to the length of the cable. This straightening force is approximately proportional to cable tension and is sensed by the transducer and results in the transducer output. Alternatively, the strain gauge can be bonded to the cable in any conventional manner.

While the bending of the cable in the transponder is not great, it will usually be sufficient to prevent excessive movement of the transponder along the length of the cable. Some movement of the transponder on the cable is not usually critical. However, if the strain gauge is bonded to the cable, the transponder should not conveniently be permitted to move.

When the transceiver module 32 receives an interrogate signal at a first frequency (for example, 14.25 kHz), the electronic circuit module 28 recognizes that a signal of that frequency has been received. The electronic circuit module 28 then causes the transducer transceiver module 32 to transmit a reply signal at a different frequency (for example, 11 kHz). The signals referred to are short pulses or bursts of audio tone energy typically in the range from 7 kilohertz to 16 kilohertz. The electronic circuit module 28 is tuned to receive and transmit within only selected frequencies such that a signal of one frequency will not interrogate more than one transponder unless it is specifically desired to do so.

Since the transponders will typically have between five and ten milliseconds of delay between recognition of a signal and the transmission of a reply, it is customary to introduce a fixed time delay between receipt of a signal and transmission of the reply. This delay is generally adjustable and is typically on the order of 25 milliseconds. The data-processing programs customarily used for interpreting the signals present in the underwater environment take into account the fixed time delay and adjust the data accordingly.

The electronic circuit module 28 is provided with facility for recognizing the receipt of an interrogate signal, waiting the necessary, fixed time delay and then causing the transponder to transmit the reply. In addition, the electronic circuit module 28 monitors the output of the strain gauge 26 for a representation of cable tension and then waits an interval after transmission of the reply and transmits a second reply at a frequency (for example, 13.5 kHz) that may differ from the frequency of the first reply, the delay between the beginning of the first reply pulse and the beginning of the second reply pulse being representative of the output of the strain gauge 26.

The strain gauge device actually used in the strain gauge transducer 26 is a device known as a load cell manufactured by SENSOTEC, INC. of Columbus, Ohio and incorporates a built-in bridge circuit, one arm of which varies with the force produced by the straightening tendancy of the cable when under tension. The transducer 26 is preferably connected to the electronic circuit module 28 through the battery and power supply module 30.

Figure 3:
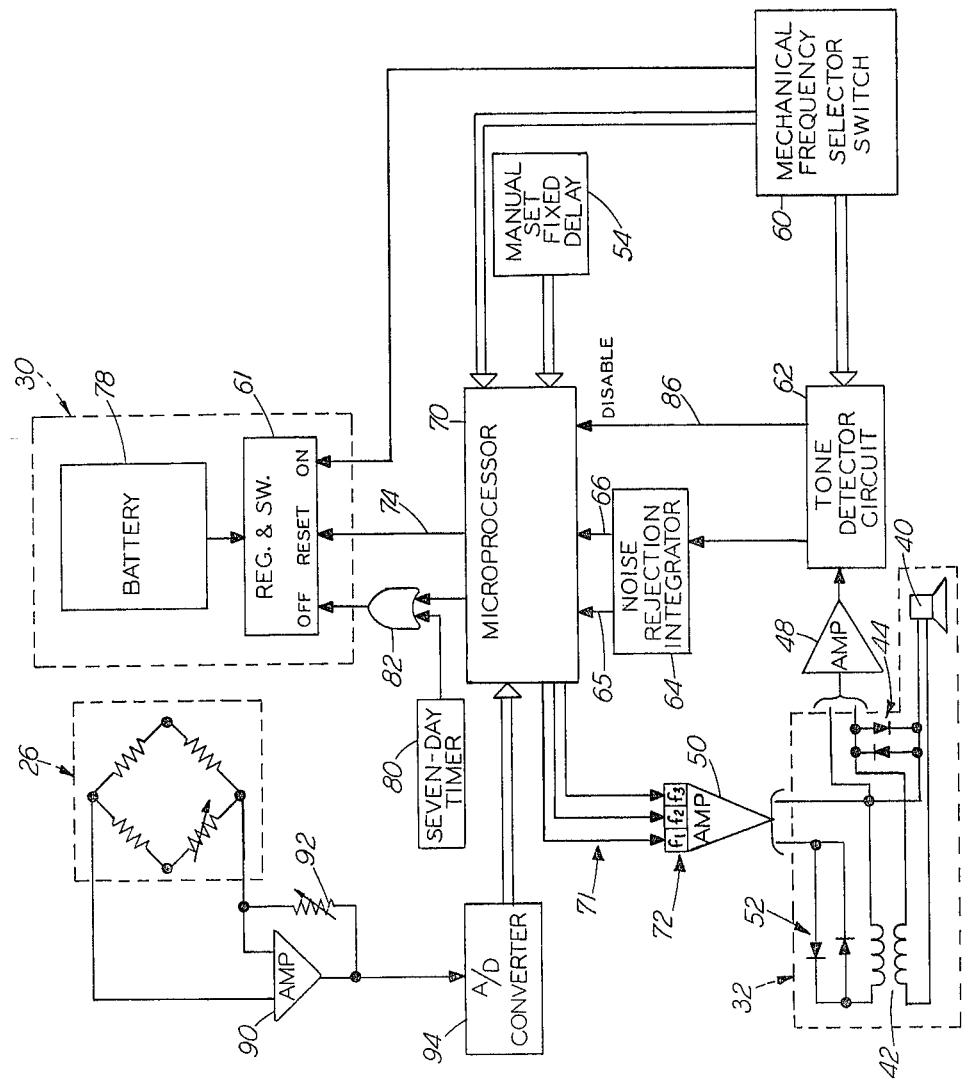
FIG. 3 is a schematic diagram of a circuit for controlling, in accordance with the present invention, a transponder as shown in FIG. 2.

In FIG. 3, there is shown a schematic diagram of a circuit comprising the electronic circuit module 28 and other functional parts of the transponder 20. The transceiver and transducer module 32 includes a conventional piezoelectric sonar crystal 40 mounted appropriately for receiving acoustic energy from the water and for applying acoustic energy to the water. The two terminals of the crystal 40 are connected in series through a coil of a transformer 42 and a pair of oppositely-polarized, parallel-connected diodes 44. An energy pulse received by the sonar crystal 40 appears across the diodes 44 and is conveyed to an amplifier 48.

When transmitting a pulse of acoustic energy into the water, the pulse of audio-frequency tone is sent from an amplifier 50 through another pair of oppositely-polarized, parallel-connected diodes 52 through the other coil of the transformer 42. By transformer action, this pulse is carried to the sonar crystal 40 for transmission to the water. The diodes 44 prevent excessive power from appearing across the input of the amplifier 48.

Before launching the transponder from the cable ship, manual switches are set at a fixed delay switch 54; and a mechanical frequency selector switch 60 is manually set from OFF to ON to supply regulated battery power to the circuitry by energizing a regulator and switch circuit 61. The application of regulated battery power to each circuit element is omitted for clarity. The manual switch 60 also selects the signal frequency to which the transponder will respond and the frequencies of the reply signals that may be transmitted by the transponder. The fixed delay switch 54 determines the amount of additional delay (typically fifteen milliseconds) that will be added between a received signal and transmission of the first reply.

The receiving frequency select signal from the mechanical switch 60 is sent to a tone detector circuit 62 which has the capability of detecting any of the possible input signal tones. The switch 60 selects from among that repertoire the signal frequency to which the tone detector will respond, much as a TV tuner might select the desired channel from among many. When the detector 62 receives and recognizes the tone to which it is designed to respond, it sends a signal to a noise rejection integrator circuit 64 which immediately sends a recognition pulse on a line 65 to a microprocessor 70 to alert the microprocessor that the selected signal tone has been recognized. To avoid responding to noise pulses that might be extant, the microprocessor waits approximately five milliseconds and interrogates a line 66 from the integrator 64 to ascertain that the recognized tone pulse has persisted long enough to be considered valid. The mechanical switch 60 has also been set to select the desired reply frequency or frequencies from the transponder. This is communicated to the microprocessor 70 and the microprocessor energizes one of the lines 71 to energize a selected one of a plurality of tone generators 72. The energized one of the tone generators 72 sends a tone pulse of the desired acoustic frequency to the amplifier 50 for transmission.

The micro-processor 70 is preferably an Intel 8748 which includes with the central processing circuitry a programmable read-only memory (PROM) and an ample random-assess memory (RAM).

The transponder is in the ON or enabled condition by reason of the switch 60 before it is launched from the cable ship. The application of regulated power has also caused the microprocessor 70 to reset the regulator and switch circuit 61 on a line 74.

Since it is customarily desired that the transponder 20 function for only a limited period of time, there are generally several ways the transponder can be disabled. One of the more simple ways to disable the transponder is to turn off its battery power after operating for a week. Consequently, one of the items reset and started by the application of regulated power is a seven-day timer 80 which, after seven days, sends a signal through an ORgate 82 to turn off the regulator and switch circuit 61.

Another way to disable the transponder is to send to it a signal or a series of signals which the tone detector circuit 62 is arranged to recognize as a command to disable the transponder. Upon recognizing such a disable signal and determining its validity, the tone detector circuit 62 sends a disable signal on a line 86 to the microprocessor 70, which then sends a disable signal through the ORgate 82 to the regulator and switch circuit 61.

The strain gauge transducer 26 is also powered through the regulator and switch 61. The strain gauge transducer 26 comprises a commercial strain gauge circuit having a pair of outputs which are connected to the inputs of an amplifier 90. Therefore, the output of the amplifier 90 is an analog representation of the tension in the cable at the transponder. A feedback resistor 92 is adjusted long before the transponder is launched in order to assure the proper scaling of the output signal from the amplifier 90.

The output of the amplifier 90 is sent to an analog-to-digital converter 94 which is conventional in nature and digitizes the output of strain gauge transducer 26 to send a digital representation of the cable tension to the microprocessor 70.

After the microprocessor 70 has sent a signal on one of the lines 71 to energize one of the tone generators 72 to cause the amplifier 50 to send a first reply pulse from the sonar crystal 40 at the frequency selected in the mechanical switch 60, it then waits an interval determined by the digital output from the analog-to-digital converter 94. After that time interval, the microprocessor 70 energizes another of the lines 71 to enable another of the tone generators 72 to cause the amplifier 50 to transmit a second reply pulse from the sonar crystal 40 at a frequency that may be the same as the first reply signal or at a different frequency (for example, 13.5 kHz). In this way, the time interval between the start of transmission of the first reply pulse and the start of transmission of the second reply pulse is controlled by the digital signal received by the microprocessor 70 that is representative of the output from the strain gauge transducer 26.

Figure 4:
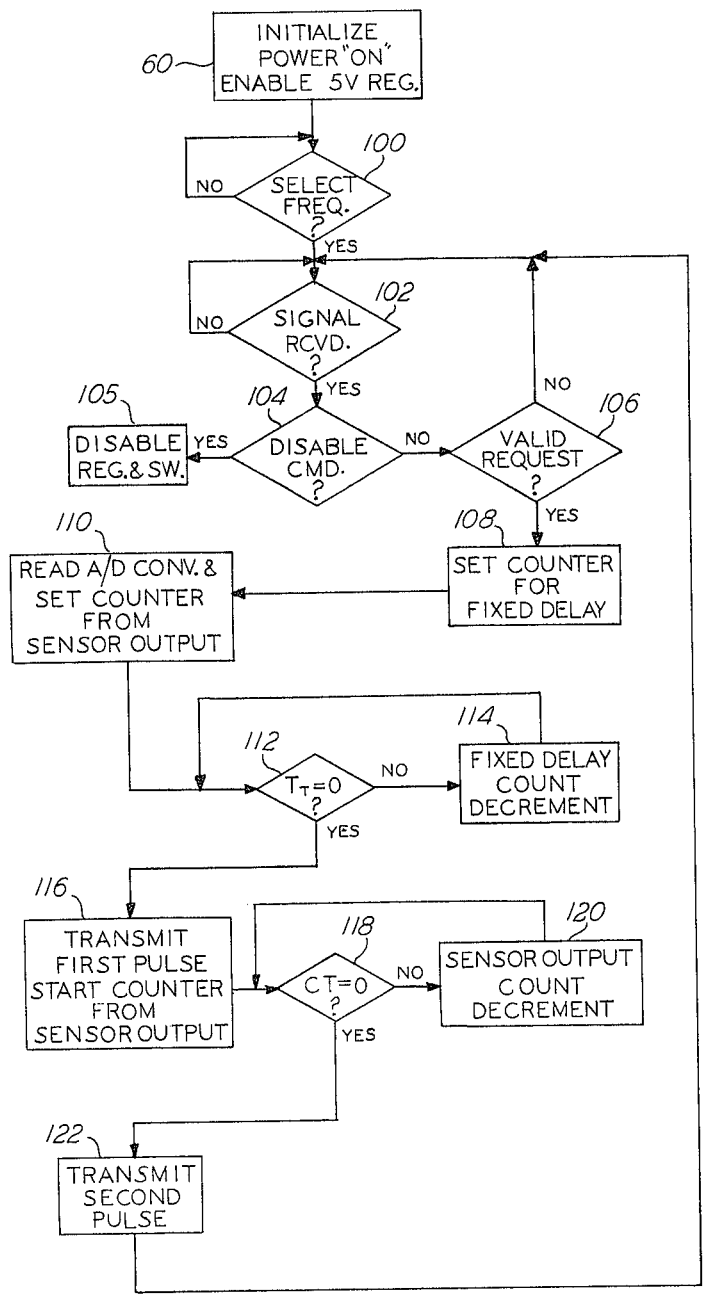
FIG. 4 is a program flow chart describing a program suitable for controlling the microprocessor shown in FIG. 3 for converting the output of a strain gauge to a time delay between transmissions of successive transponder reply signals.

Referring now to FIG. 4, there is shown a program flow diagram for the operation of the microprocessor 70 to accomplish the operations set forth above. The program instructions represented by this flow diagram are stored in the PROM of the microprocessor.

Actuation of the manual switch 60 connects the battery 78 (preferably nine volts) to the regulator portion of the circuit 61 which then supplies regulated power (preferably five volts) to the rest of the circuitry, including the microprocessor 70 and an electronic switch portion of the circuit 61. The microprocessor 70 then proceeds through its manufacturer's standard initialize routine. The ON condition of the switch 60 assures that the electronic switch portion of the circuit 61 starts in the ON condition upon the application of regulated power.

The microprocessor proceeds to a decision point 100 at which it ascertains whether or not the frequencies for recognizing received signals and transmitting reply signals have been manually selected at the mechanical frequency selector switch 60. If all of the frequencies have not been selected, the program goes in a short loop constancy looking for complete frequency selection at the switch 60. After the frequencies have been selected, the program begins to listen for an output from the tone detector 62 at a decision point 102. As long as no signal is received by the tone detector circuit 62, the program runs in a short loop constantly checking for a signal.

When a signal is received, the program proceeds to a decision point 104 at which the microprocessor 70 determines whether or not the command received from the tone detector circuit is a "disable" command. If yes, the command will have been received on line 86 (FIG. 3); and the program proceeds at a step 105 to send a disable signal through the ORgate 82 to turn off the regulator and switch circuit 61. This terminates the program, and the microprocessor can not be reset without the initializing action of the mechanical switch 60.

If the received signal is determined at the decision 104 to be other than a disable command, then it may be the start of an acoustic signal to which the transponder is to respond. The program then waits for a time interval of approximately five milliseconds while it proceeds to a decision 106 to determine if the integrator circuit 64 sends a signal on line 66 to indicate the validity of the received signal. If there is no validity of the signal at the end of the appropriate time interval, the decision 106 returns the program in a loop to the input of the decision 102. If there is a positive determination of signal validity, the decision 106 advances the program to a step 108 to extract a fixed delay interval from the fixed delay switch 54. The binary code from the fixed delay switch 54 is simply used as an initial count for an internal decrement function which must be counted down to zero at a fixed counting rate before the first reply can be transmitted.

The program proceeds at a step 110 to read the digital output from the analog-to-digital converter 94 which digital output contains the representation of tension as generated by the strain gauge transducer 26. This can be recorded and converted to a count for later use in a decrement function to determine a time delay.

The program then proceeds to a decision 112 which determines whether or not the count representing the fixed time interval that was set into memory at step 108 has been reduced to zero. If not, the program proceeds to a decrement function 114 and returns in a loop to the decision 112. The number set into the counter is selected to keep the program in this decrement loop for the fixed delay interval. When the time delay count entered in step 108 has been counted down or reduced to zero, the decision 112 advances the program to a step 116 to cause the microprocessor to issue a signal on one of the wires 71 to energize one of the tone generators 72 to send the first reply of the transponder. This same step 116 also starts the reducing count with the results of the output from the analog-to-digital converter 94.

The program then proceeds to a decision 118 which looks at that count and determines whether or not the count is zero. If the count is not zero, the program proceeds to a decrement function 120 and in a loop back to the decision 118. The loop continues until the count has reached zero, thereby indicating that the interval or time delay representative of cable tension has elapsed. The counting loop operates at a fixed rate determined by the clock that paces the microprocessor. The program then advances to a step 122 at which the microprocessor selects another one of the lines 71 to enable another tone generator 72 to cause transmission of the second reply signal pulse at its appropriate frequency.

The program then returns to the input of the decision 102 in order once again to look for an interrogate signal.

Although the present invention has been disclosed in the environment of a cable ship laying and positioning an underwater cable or sensor array, it is to be understood that the invention in its broader aspects may be used in communicating accurately other types of information about other underwater objects such as conduits, pipelines, towing lines, other arrays, or support lines. It is intended, therefore, that such revisions and variations of the invention which can readily be expected, by those skilled in the art, to meet individual design requirements, will be included within the scope of the following claims as equivalents of the present invention.

I claim:

1. A telemetering transponder for transmitting information about the tension to which an underwater object is subjected, in response to receipt of a signal consisting of single pulse at a first frequency, comprising:
   means associated with the object and adapted to receive the single signal pulse at the first frequency and in response thereto to transmit a first reply pulse at a second frequency that may differ from the first frequency;
   a strain gauge in communication with the object and arranged to produce an output indicating the tension to which the object is subjected;
   means for converting the output of the strain gauge to a count;
   means for reducing the count to zero at a fixed counting speed; and
   means for transmitting a second reply pulse at a third frequency that may differ from the second frequency, upon the count reaching zero.

* * * * *